July 20, 1937.  W. E. VERGAN  2,087,417
PRESSURE GAUGE
Filed Jan. 11, 1934
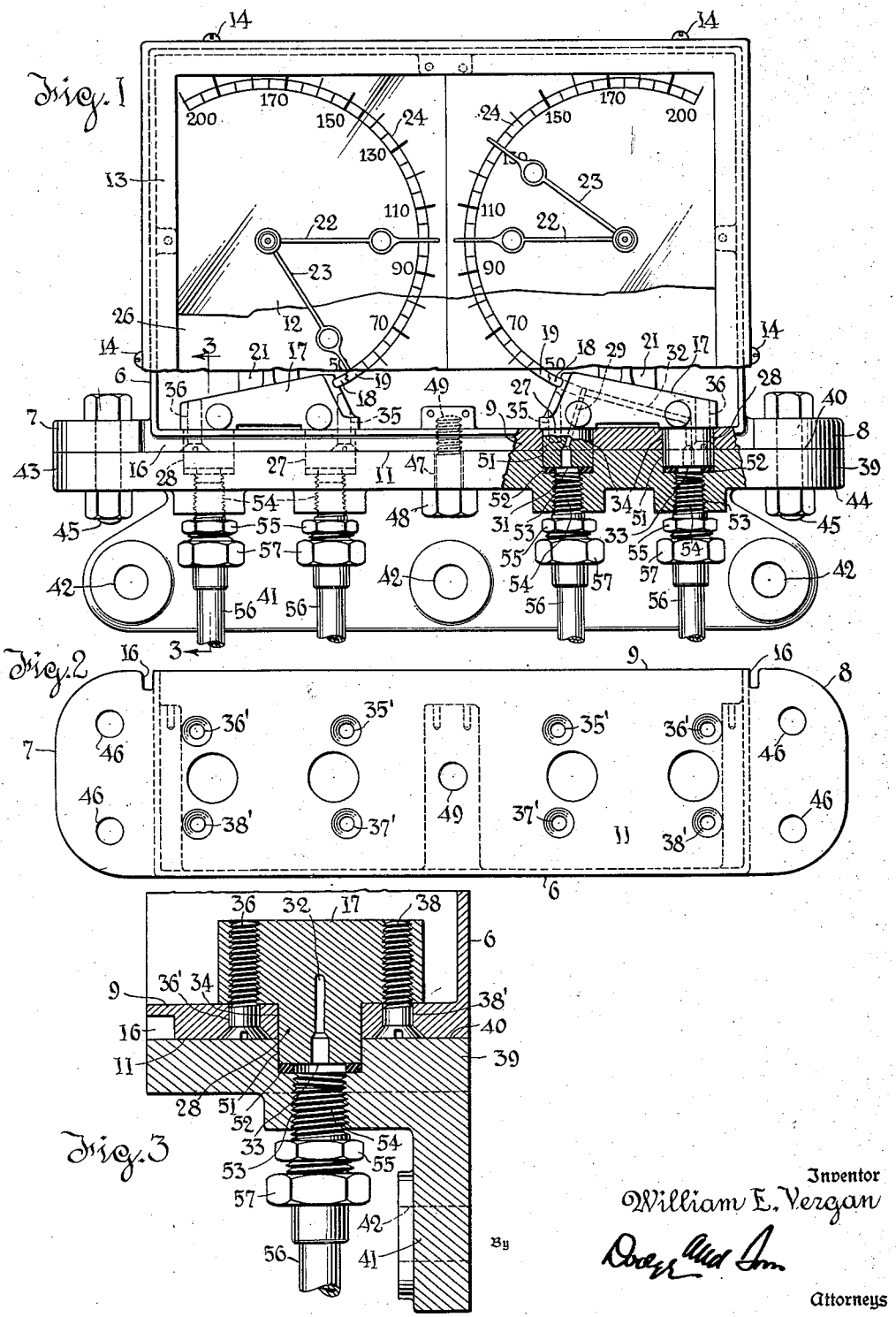
Inventor
William E. Vergan
By
Attorneys Patented July 20, 1937

2,087,417

UNITED STATES PATENT OFFICE 2,087,417

PRESSURE GAUGE

William E. Vergan, San Antonio, Tex., assignor to The New York Air Brake Company, a corporation of New Jersey Application January 11, 1934, Serial No. 706,260

13 Claims. (Cl. 73—109)

This invention relates to pressure gauges, and more particularly to the manner of connecting up the pressure indicating mechanism of the gauge with the pressure fluid conductor leading thereto.

Fluid pressure gauges of the Bourdon tube type, to which this invention is particularly directed, generally comprise a gauge case, a pressure indicating device, including a Bourdon tube, mounted in the case, and a threaded nipple projecting from the case for direct attachment to a pressure fluid conductor. This threaded nipple, which communicates with the pressure indicating device, in some instances is a part of the indicating device and in others it is attached to the case. The case itself may be carried by the pressure fluid conductor or it may be mounted by means of brackets.

In the case of multiple type gauges, i. e., those wherein a plurality of independently operating pressure indicating devices are mounted in the same gauge case, there is a corresponding number of threaded nipples projecting from the case in spaced relation, whereby a similar number of pressure fluid conductors may be connected thereto.

Gauges of the types mentioned are open to various objections from a practical standpoint, among which may be mentioned inaccuracies in indicated pressures, length of time required to attach and remove the gauge, particularly the multiple type, and wear and breakage resulting from these operations. Where a pipe is attached to the threaded nipple which forms part of the pressure indicating device, the strain resulting from connecting the pipe to the nipple directly or by means of the usual union or other suitable coupling, is transferred partly to the indicating mechanism. This mechanism, particularly the Bourdon tube or spring, is consequently distorted and inaccuracies in readings of the gauge result. This undesirable condition is aggravated whenever the gauge becomes loose upon its brackets. The present methods of bolting or otherwise securing pressure gauges to brackets has a tendency to spring the gauge case and thereby cause additional distortion and inaccurate readings. In removing and installing present type gauges, it is necessary to disconnect and connect threaded pipe joints, which results in wear and tear on the threads of the connected parts. Frequent repetition of these operations oftentimes results in breakage of the socket member of the connection.

The principal purpose of the present invention is to eliminate the direct connection of the pressure fluid pipe to the pressure indicating mechanism. It is also intended to do away with the direct connection of the pipe to the gauge case. In addition, the arrangement proposed includes no screw-threaded or similar connection between the projecting gauge nipple and the part or parts with which it engages when in operative position. Similarly, the gauge case is intended for mounting so that the gauge assembly may be removed or attached without the necessity of relative rotation of the assembly and the pipe. This arrangement practically precludes the possibility of distortion of the indicating mechanism at all times.

More specifically, it is proposed to provide a member, preferably in the form of a bracket, which serves as a connecting means between the pipe and the gauge assembly and to which the pipe is permanently connected, or to which the pipes are permanently connected in the case of a multiple type gauge. The gauge proper is detachably mounted upon this bracket which is suitably bored to provide for communication between the pipe and the pressure indicating means.

In the drawing which discloses a practical embodiment of the invention:—

Fig. 1 is a front elevation of a gauge of the multiple type with my improvements applied thereto, certain of the parts being partially broken away to show a portion of the pressure indicating mechanism and the manner in which this mechanism communicates with the pressure fluid pipes;

Fig. 2 is a bottom view of the gauge case proper with all the other parts of the gauge removed; and Fig. 3 is a section on line 3—3 of Fig. 1 showing the manner in which sealing engagement is provided between the projecting nipple of the indicating means and the bracket to which the gauge case is connected.

The pressure gauge illustrated and hereinafter described is of the quadruplex type, that is, it includes four independent pressure indicating devices mounted in a single case and adapted for connection to separate pressure fluid conductors. It is not intended, however, that the present invention be limited to this type of gauge, since many of the features thereof are equally applicable to gauges including but a single pressure indicating device.

The gauge case 6, which preferably is of cast brass, is provided with attaching ears or flanges 7, 8 at opposite sides thereof. These ears form integral extensions of the bottom wall 9 of the case and the under side of the case and the ears are machined to provide a plane, smooth surface 11.

Gauge case 6 is open only on the front side and this side is adapted to be covered by a glass 12 and a flanged frame 13 which slips onto the front of the case. Screws 14 secure frame 13 to the case. A U-shaped groove 16 formed in the front edge of case 6 receives the lower part of frame 13.

A pair of pressure indicating units is mounted rigidly side by side in case 6. These units are adapted for removal and replacement entirely independently of each other, as explained later. Since the units are identical, except that they are reversely arranged, only one of them will be described in detail.

Each of the pressure indicating units comprises two pressure indicating devices, each adapted for connection to a separate pressure fluid conductor. A frame member 17 forms the base of each of these units and has mounted thereon a pair of Bourdon tubes 18, 19 and a supporting standard 21. Tube 18 is adapted to actuate an indicating hand 22 through the usual mechanism (not shown). Tube 19 similarly actuates an indicating hand 23. Hands 22 and 23 cooperate with a scale 24 on a dial 26 to indicate the respective pressures.

Frame member 17 is formed on its under face with a pair of depending, smooth-surfaced nipples or bosses 27, 28 of cylindrical form. A passageway 29 extending through frame member 17 and nipple 27 serves to place Bourdon tube 18 in communication with the lower ported end 31 of the nipple. A similar passage 32 serves to provide communication between Bourdon tube 19 and the lower ported face 33 of nipple 28.

Each of the nipples 27, 28 projects through and has a snug fit with a corresponding opening 34 provided for this purpose in the lower wall 9 of case or frame 6. In this manner, provision is made for rigid mounting of each of the gauge units in the case. In order to secure each unit firmly in position, four countersunk head screws 35 to 38, inclusive, project through corresponding openings 35', 36', 37', 38' in the bottom wall 9 of case 6 and have threaded engagement with suitable tapped holes in the frame member 17.

Gauge case 6 is supported upon a bracket member 39, the upper face 40 of which is machined to provide a smooth, plane surface engaging the corresponding plane surface 11 of case 6 in order to provide intimate contact between the parts when they are secured together. At its rear edge, bracket 39 is provided with a depending flange 41 having a series of openings 42 whereby it may be attached rigidly to another bracket or to any other suitable support.

In order to connect gauge case 6 to bracket 39, the latter is formed at opposite ends with a pair of ears 43, 44 corresponding to ears 7, 8 formed on the case 6. A number of bolting devices 45 are located in openings 46 provided in the ears 7, 8 of the case and registering openings formed in the ears 43, 44 of the bracket. In addition to the fastening means just described, bracket 39 is provided centrally with an opening 47 through which projects a machine screw 48 into threaded engagement with a suitable socket 49 formed in the lower wall 9 of the gauge case. In this manner, the case and its supporting bracket are rigidly secured together.

As shown clearly in Figs. 1 and 3, the socket nipples 27, 28 of each of the pressure indicator units project below the under face 11 of case 6. Bracket 39 is provided on its upper face 40 with a corresponding series of recesses or sockets 51 into which the nipples fit. Located in the bottom of each of the sockets 51 is a gasket 52 or other suitable packing means with which the lower end of the nipple engages in order to provide sealing contact between the nipple and the bracket when the parts are in operative position.

Leading from the bottom of each socket 51 is a threaded passage 53 which opens onto the under side of bracket 39. Into the lower end of this passage is threaded a pipe nipple 54 provided with the usual wrench grip 55. A pressure fluid conductor 56 is connected to each of the pipe nipples 54 by means of the conventional pipe union 57. Of course, pipes 56 may be connected to bracket 39 by any other means, if desired.

Assuming that the gauge is in the completely assembled condition of Fig. 1, it will be noted that bolting devices 45 and machine screw 48 serve rigidly to clamp gauge case 6 in position upon bracket 39. At this time, the adjacent finished surfaces 11 and 40 of the case and bracket respectively are in intimate contact with each other and the lower flat ends of the several depending nipples 27, 28 are in close engagement with the gaskets 52 in order to provide fluid tight communication between pipes 56 and the respective pressure indicating mechanisms with which they are connected.

Bracket 39 forms a member or support to which the several pipes 56 are in a sense permanently connected, while gauge case 6 is detachably connected to the bracket. Hence, with the described arrangement, when it is desired to remove the gauge for inspection or replacement purposes, it is not necessary to break any of the pipe connections, but the gauge is merely removed from bracket 39 following disconnection of the bolting devices 45 and screw 48. After detachment of cover frame 13 and glass 12, cap screws 35 to 38, inclusive, may be removed, and either or both of the pressure indicating units taken from the case. In replacing the parts, the operations are the opposite of those just described. When the assembled gauge is replaced upon bracket 39, the indicator nipples slip into sockets 51 and the fastening means are then put in place and tightened. Of course, bolts, cap screws, clamps, or any other suitable fastening devices may be employed to connect the case and the bracket together, it only being necessary that adequate means be used to provide a rigid connection between the parts.

It is important to note that, during both the removal and replacement operations described, there is no relative rotary or other movement between the gauge and the bracket 39 which might serve to distort the pressure indicating mechanism and thereby render its operation inefficient.

The gauge assembly, when being either removed or replaced, is merely moved bodily directly toward or away from the attaching face 40 of the bracket.

Employment of the member or bracket 39 eliminates entirely direct connection of the pipes 56 either to the pressure indicating mechanism or to the gauge case itself, thereby precluding the usual resulting distortion of the indicator mechanism when pipe connections to the gauge are made or broken. The possibility of distortion is further prevented by providing for non-threaded engagement between the depending nipples of the indicating mechanism and bracket 39.

The described manner of mounting the gauge considerably lessens the time required for removal and replacement operations. Also, since the gauge may be removed or replaced without disturbing the pipe connections 57, considerable wear and tear on these parts is eliminated.

What is claimed is:—

1. In a pressure gauge, a gauge case having an opening in its lower face; pressure indicating means mounted in said case and including a depending ported nipple projecting through said opening in the case; a bracket supporting the gauge case and provided with a socket in its upper face into which said nipple extends; a gasket in the bottom of said socket; means detachably clamping the gauge case and the bracket directly together so as to force the lower end of the nipple into sealing engagement with the gasket; and a pressure fluid conductor detachably secured to the under side of the bracket and communicating with said socket and the ported nipple by a passageway provided in the bracket.

2. In a pressure gauge, a gauge case having an opening in its lower face; pressure indicating means mounted in said case and including a depending nipple projecting through said opening in the case; a bracket supporting the gauge case and provided with a socket in its upper face into which said nipple extends; a gasket in the bottom of said socket, the gauge case and the bracket having said lower and upper faces thereof in abutting relation and being formed with connecting extensions; and means detachably connecting said extensions to clamp the lower face of the case and the upper face of the bracket firmly together and to force the lower end of the nipple into sealing engagement with the gasket, said support being formed with a passage leading from said socket to a port in its lower face adapted for connection to a pipe.

3. The gauge construction of claim 2 further characterized in that said connecting means are in the form of bolts and nuts coacting with registering openings in said connecting extensions and that a pipe nipple screwed into said port has a union coupling connection with a pipe at its outer end.

4. In a pressure gauge, a gauge case having a lower flat face provided with one or more openings therein; one or more pressure indicating devices mounted in said case, each of said devices including a depending nipple projecting through one of said openings; a bracket supporting the gauge case, said bracket being formed with a depending attaching flange and a flat upper face provided with one or more spaced sockets into each of which one of said nipples projects; a gasket in each of said sockets; bolting means extending through registering openings in bolting flanges provided on the gauge case and the bracket to clamp the lower face of the case and the upper face of the bracket firmly together and to force each nipple into sealing contact with its respective gasket; and one or more pipes each attached by a union connection to the under side of the bracket and each communicating therethrough with one of said sockets and the corresponding pressure indicating device.

5. In a gauge, a bracket member having a socket; a pipe; means detachably connecting the pipe to the bracket member; a gauge frame mounted on the bracket member; means detachably but rigidly securing the gauge frame directly to the bracket member; and pressure indicating means located in the gauge frame, said indicating means including a nipple projecting through an opening in the frame into the socket in the bracket member and communicating with said pipe therethrough.

6. In a pressure gauge, a gauge assembly comprising a gauge case and pressure indicating means mounted therein, said indicating means including a ported nipple projecting through an opening in the gauge case; a base member to which said assembly is detachably connected, with the gauge case secured directly to the base member, so that said base member and said assembly are adapted for operative engagement with and disengagement from each other solely by relative bodily movement of said parts toward and from each other, said base member having a socket into which said nipple extends; sealing means in the socket having fluid-tight engagement with said nipple; and a pressure fluid conductor attached to said base member and communicating therethrough with said nipple.

7. The combination of a gauge case having one or more openings therein; gauge mechanism in said case, including one or more ported nipples each of which projects through one of said openings; removable means holding said gauge mechanism and gauge case in assembled relation; a base for the case, to which one or more spaced pipe connections may be made, provided with one or more means each adapted to mate with one of said nipples and to each of which one of said pipe connections leads to communicate with its corresponding nipple; and releasable means for connecting said case directly to the base.

8. The combination of a gauge case; a gauge mechanism having a supporting member provided with a nipple projecting through an opening in the case, and having a port for communicating fluid pressure to be gauged to the gauge mechanism; removable means holding the gauge mechanism and the case in assembled relation; a base having means to mate with said nipple, said base also having means for connecting a pipe with said mating means; and releasable means for connecting said case directly to the base.

9. In a pressure gauge, a gauge case; a pressure indicating device mounted in the case and having a ported nipple extending through an opening in the case; a base member carrying said case; a fluid conductor removably attached to said base member and communicating therethrough with said nipple; packing means interposed between the base member and said nipple; and releasable means clamping the base member directly to the case so as to force the nipple, the base member and the packing means into sealing engagement with each other.

10. In a pressure gauge, a gauge case; a pressure indicating device mounted in said case and provided with a non-threaded, ported nipple portion projecting through an opening therein; a base member carrying said case and having a non-threaded socket into which said nipple portion extends; packing means in said socket; and releasable means clamping the base member and the case directly together so as to force the nipple portion, the base member and the packing means into sealing engagement with each other.

11. In a pressure gauge, a gauge case having one or more openings therein; one or more pressure indicating devices mounted in said case, each of said devices including a nipple projecting through one of said openings; a bracket supporting the gauge case and provided with one or more sockets into each of which one of said nipples extends; a gasket in each socket; means detachably securing the gauge case directly to the bracket with each nipple in sealing engagement with its respective gasket; and one or more pressure fluid conductors detachably connected to said bracket and each communicating therethrough with one of said sockets and the corresponding pressure indicating device.

12. In a pressure gauge, a gauge case; pressure indicating means mounted in said case, including a ported nipple located in an opening in the gauge case; a bracket carrying the gauge case and to which the case is directly and detachably connected, said bracket having means mating with said nipple; and a pressure fluid conductor removably connected to the bracket and communicating with the pressure indicating means through the bracket and the mating means.

13. In a pressure gauge, a gauge case having an opening therein; pressure indicating means mounted in said case; a bracket carrying the gauge case and to which the case is directly and detachably connected, said bracket being adapted for rigid mounting on a support; and a pressure fluid conductor removably connected to the bracket and communicating therethrough with the pressure indicating means, said bracket having a socket which communicates with said pressure fluid conductor and said pressure indicating means including a ported nipple projecting through said opening in the gauge case into said socket in the bracket.

WILLIAM E. VERGAN.